(No Model.)

H. CARMICHAEL.
THERMOSTATIC VESSEL.

No. 487,713. Patented Dec. 13, 1892.

WITNESSES:
S. C. Fearing
F. H. Mackenzie

INVENTOR:
Henry Carmichael
By Jas. H. Churchill
Atty.

UNITED STATES PATENT OFFICE.

HENRY CARMICHAEL, OF MALDEN, MASSACHUSETTS.

THERMOSTATIC VESSEL.

SPECIFICATION forming part of Letters Patent No. 487,713, dated December 13, 1892.

Application filed June 22, 1892. Serial No. 437,625. (No model.)

*To all whom it may concern:*

Be it known that I, HENRY CARMICHAEL, residing in Malden, county of Middlesex, and State of Massachusetts, have invented an Improvement in Thermostatic Vessels, of which the following description, in connection with the accompanying drawings, is a specification, like letters on the drawings representing like parts.

This invention relates to a novel thermostatic cup or vessel especially adapted to be used to maintain the temperature of its contents at a substantially-constant point.

My improved thermostatic vessel is especially adapted to be used by dentists and like persons employing heated fluids, which, if properly used, should be heated to substantially the same temperature.

In accordance with my invention a vessel is provided, preferably at its bottom, with an auxiliary or supplemental chamber adapted to contain a fluid and which is connected to a fluid-containing chamber in a base upon and above which the said vessel is supported. The base referred to has secured to it a gas-burner, preferably constructed after the manner of the well-known Bunsen burner, it being provided with a gas-inlet at its bottom and a gas-outlet near its upper end. The gas-outlet referred to is controlled by a valve automatically operated by a flexible diaphragm or partition interposed between the gas-chamber of the burner and the liquid-containing chamber of the base, the said diaphragm being moved in one direction to effect the closing of the gas-outlet for the burner when the fluid contained in the chamber of the vessel is expanded and to be moved in the opposite direction to open the gas-outlet when the fluid in the chamber is contracted, as will be described. The burner is provided with a supplemental gas-duct communicating with the gas-inlet, as will be described, and extended, preferably, to the top of the burner, whereby a substantially-small flame may be maintained lighted when the valve for the burner is closed.

Figure 1:
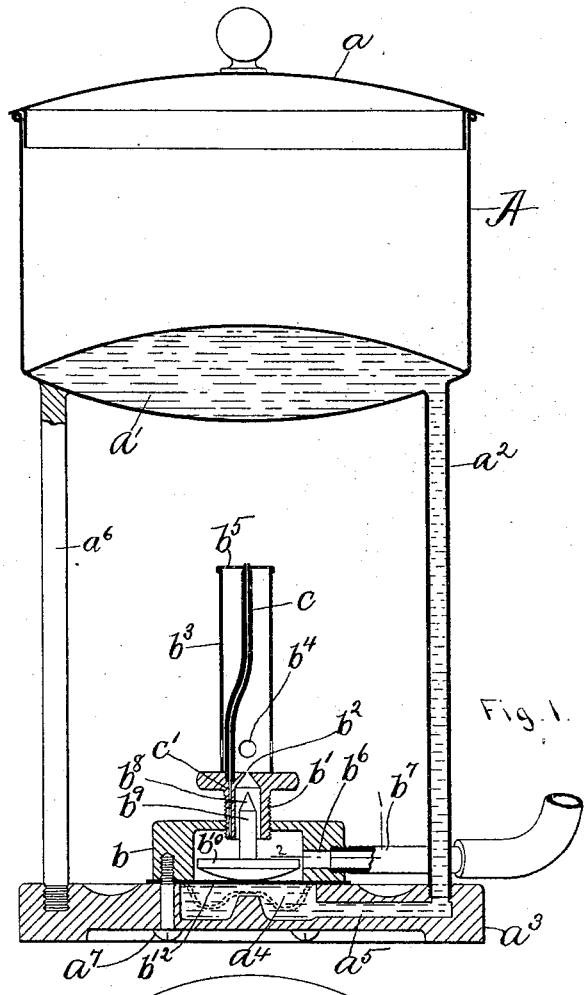
Figure 2:
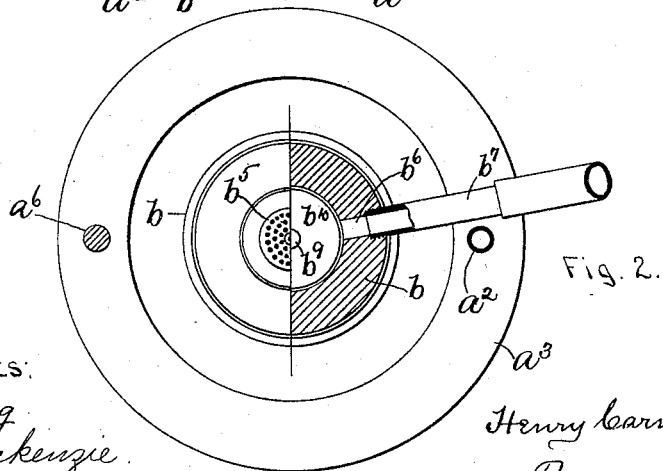

Figure 1 represents a vertical section of a thermostatic vessel embodying my invention; and Fig. 2 a sectional plan view of the vessel shown in Fig. 1, the section being taken on the line 2.

Referring to Fig. 1, A represents a vessel which may be of any usual or well-known construction, it being provided with a removable top or cover $a$. The vessel A is constructed to leave within it, preferably at its bottom, an auxiliary chamber $a'$, which is closed, as herein represented, with the exception of an outlet connected to a vertical pipe or tube $a^2$, screwed into or otherwise secured to a base $a^3$, provided with a chamber $a^4$, communicating with the tube $a^2$ by a passage $a^5$. The vessel A, as herein represented, is also supported upon the base by suitable legs or uprights $a^6$. The base $a^3$ has secured to it, as by screws $a^7$, (only one of which is shown in Fig. 1,) the chambered bottom $b$ of a burner, preferably constructed after the manner of the well-known Bunsen burner, it consisting of a tubular portion or threaded nipple $b'$, screwed into the bottom $b$ and provided with a gas-outlet $b^2$ and a tube or pipe $b^3$, secured to the nipple $b'$, the tube or pipe $b^3$ being provided with air-ducts $b^4$ near its lower end, and, as herein represented, with a perforated cap $b^5$. The chamber-bottom $b$ of the burner is provided with a gas-inlet passage $b^6$, with which communicates a gas-inlet pipe $b^7$. The gas-outlet $b^2$ for the burner is controlled by a valve $b^8$, herein shown as the pointed end of a stem $b^9$, secured to or forming part of a disk or plate $b^{10}$, normally resting upon a flexible diaphragm $b^{12}$, interposed between the bottom $b$ of the burner and the base $a^3$, the said diaphragm forming a dividing-wall between the liquid-containing chamber $a^4$ and the gas-containing chamber of the burner. The burner is provided with a supplemental tube $c$ of substantially-small diameter, which communicates with the passage $c'$ in the tube or nipple $b'$, the passage $c'$ being of substantially-small diameter to permit of the escape of a small or fine stream of gas from the burner. As represented in the drawings, the valve $b^8$ is open, thereby permitting the free escape of gas from the burner through the outlet $b^2$ into the tube $b^3$, and with the valve in this position the burner may be supposed to be lighted, the small stream of gas escaping through the supplemental tube $c$ also being supposed to be lighted.

The heat generated from the burner strikes against the under side of the vessel A and heats the fluid contained in the chamber $a'$ until the latter has been sufficiently heated to create a pressure upon the flexible diaphragm $b^{12}$. The pressure exerted upon the diaphragm $b^{12}$ distends the same and lifts the disk $b^{10}$, thereby bringing the valve $b^8$ toward the gas-outlet $b^2$, and when the vessel A has been heated sufficiently to create enough pressure to lift the valve $b^8$ sufficiently to close the gas-outlet $b^2$ the supply of gas will be cut off from the tube $b^3$ and only a substantially-small flame will be left at the mouth of the supplemental tube $c$. The valve $b^8$ remains closed as long as the temperature of the fluid in the chamber $a'$ of the vessel A remains at such point as to create pressure sufficient to hold the valve $b^8$ closed; but when the temperature of the vessel A is lowered—as, for instance, by pouring into the vessel a liquid of a lower temperature—the temperature of the fluid in the chamber $a'$ is lowered, and the pressure upon the diaphragm $b^{12}$ is thereby reduced, permitting the valve $b^8$ to be drawn away from the gas-outlet $b^2$ by the weight or disk $b^{10}$. The gas is then free to escape through the opening $b^2$ and through the tube $b^3$ and coming in contact with the minute flame at the mouth of the supplemental tube $c$ will be again ignited, and the fluid in the chamber $a'$ will be again subjected to a considerable heat, which is transmitted to the contents of the vessel A, and when the contents in the vessel A have been heated to the desired or proper temperature the fluid in the chamber $a'$ will at that time have been heated sufficiently to create the proper or necessary pressure requisite to distend the diaphragm $b^{12}$ sufficiently to close the gas-outlet $b^2$.

It will thus be seen that the temperature of the vessel A when not used for heating substances placed within it is maintained substantially constant; but when the said temperature is lowered, as by filling the vessel with a cooler substance, it requires but a substantially-short time in which to again bring the temperature of the vessel and its contents up to the desired point. Furthermore, it will be seen that the vessel and its contents when once heated to the desired temperature are maintained substantially at the said temperature, for as soon as the temperature of the contents of the vessel is lowered, even to a slight degree, the pressure upon the diaphragm $b^{12}$ is diminished to a corresponding degree and the valve $b^8$ is opened to permit of the escape of gas, which becomes ignited by the flame from the supplemental tube $c$ and again heats the vessel A and its contents, bringing the same back to the temperature desired. It will thus be seen that the heat supplied to the vessel A is automatically controlled by the pressure of the fluid upon the diaphragm $b^{12}$.

I claim—

1. In a thermostatic vessel, the combination, with a vessel provided with a fluid-containing chamber, of a base having a fluid-containing chamber in connection with the chamber of the said vessel, a gas-burner provided with a gas-chamber and with a gas-outlet, a valve located in said gas-chamber to control said outlet, and a diaphragm interposed between the gas-chamber of the burner and the fluid-chamber of the base and acted upon by the fluid in the chamber of the base to automatically move the valve and close the said gas-outlet when the fluid in the chamber of the vessel has been heated to a predetermined point, substantially as described.

2. In a thermostatic vessel, the combination, with a vessel provided with an auxiliary chamber $a'$, of a base having a chamber in communication with the chamber of the vessel, a gas-burner having a chambered bottom secured to the said base and provided with a gas-outlet, a valve located in the chamber of the burner to control said outlet, and a diaphragm interposed between the chambered bottom of the burner and the chambered base and automatically operating on said valve, and a supplemental gas-outlet, substantially as described.

3. In a thermostatic vessel, the combination, with the vessel A, provided with the chamber $a'$, of a base $a^3$, having a chamber $a^4$ and a pipe $a^2$, connecting said chambers, a burner secured to said base and consisting of a chambered bottom $b$, provided with a gas-inlet, a nipple $b'$, having a gas-outlet, a tube $b^3$, mounted on said nipple, a valve $b^8$, co-operating with the gas-outlet, a disk or weight attached to said valve, a diaphragm interposed between the chamber-bottom of the burner and the chambered base and adapted to move said valve to close the gas-outlet, and a supplemental gas-outlet $c$, substantially as described.

In testimony whereof I have signed my name to this specification in the presence of two subscribing witnesses.

HENRY CARMICHAEL.

Witnesses:
 JAS. H. CHURCHILL,
 SADIE C. FEARING.